(12) United States Patent
Sola et al.

(10) Patent No.: US 6,561,331 B1
(45) Date of Patent: May 13, 2003

(54) TRANSMISSION UNIT FOR A VEHICLE

(75) Inventors: Cesare Sola, Valperga Caluso; Giovanni Tornatore, S. Benigno Canavese, both of (IT)

(73) Assignee: Magneti Marelli S.P.A, Milan (IT)

( * ) Notice: Subject to any disclaimer, the term of this patent is extended or adjusted under 35 U.S.C. 154(b) by 0 days.

(21) Appl. No.: 09/607,850

(22) Filed: Jul. 3, 2000

(30) Foreign Application Priority Data

Jul. 2, 1999 (IT) .......................................... TO99A0577

(51) Int. Cl.[7] .............................................. F16D 67/04
(52) U.S. Cl. ................................. 192/13 R; 192/30 W
(58) Field of Search ............................ 192/13 R, 18 A, 192/91 A, 30 W

(56) References Cited

U.S. PATENT DOCUMENTS

| 3,834,499 A | * | 9/1974 | Candellero et al. ........... 477/73 |
| 3,866,727 A | | 2/1975 | Myers |
| 3,912,058 A | * | 10/1975 | Parkins ..................... 192/18 A |
| 3,942,617 A | * | 3/1976 | Poon ..................... 192/13 R X |
| 3,971,461 A | | 7/1976 | Conroy et al. |
| 4,108,295 A | * | 8/1978 | de Gennes ............ 192/13 R X |
| 4,534,454 A | | 8/1985 | Brooks |
| 4,607,736 A | * | 8/1986 | Kelley ......................... 192/18 |
| 5,722,520 A | * | 3/1998 | Beyer ....................... 192/13 R |
| 5,758,758 A | * | 6/1998 | Friedrich ............. 192/30 W X |
| 5,823,308 A | * | 10/1998 | Ladin et al. ............... 192/13 R |

FOREIGN PATENT DOCUMENTS

EP          0 328 362          12/1993

OTHER PUBLICATIONS

European Search Report for EP 00 11 3946, Sep. 9, 2000.*

* cited by examiner

Primary Examiner—Rodney H. Bonck
(74) Attorney, Agent, or Firm—Merchant & Gould P.C.

(57) ABSTRACT

A transmission unit for a vehicle has a clutch unit provided with a flywheel adapted to be coupled to a drive shaft of the vehicle, and a motion output shaft adapted to be connected to an input shaft of a gear change, the transmission unit further comprising a braking device of the output shaft and a single actuator unit common to the clutch unit and the braking device in order to actuate this braking device when the clutch unit is in a disengaged condition.

6 Claims, 2 Drawing Sheets

TRANSMISSION UNIT FOR A VEHICLE

The present invention relates to a transmission unit for a vehicle.

BACKGROUND OF THE INVENTION

Transmission units for vehicles are known which comprise gear changes with gearing adapted to vary the transmission ratio in a discrete manner, and a clutch adapted to transmit motion from the vehicle engine to the input shaft or primary shaft of the gear change. Transmission units of an automatic or servo-assisted type are in particular known in which the transmission ratio is varied and the clutch engaged/disengaged by actuators of electric, pneumatic or hydraulic type operated and controlled by an electronic control unit of the vehicle.

As is known, during each gear change, it is necessary to eliminate the relative speed difference between the gears to be coupled with the clutch disengaged. For this purpose, rather complex transmission units are known, which are costly and of considerable size, comprising a plurality of synchroniser rings associated with each gear of the gear change.

As an alternative, it is known to use gear changes provided with a single braking synchronisation member.

The braking member is housed in the structure of the gear change and is adapted to reduce the speed of the primary shaft, with the clutch disengaged, when a gear with a transmission ratio greater than the current gear is being selected.

Transmission units of the type described above are not very satisfactory as they are also relatively complex, costly and bulky. In order to actuate and control the braking member it is necessary to provide a dedicated actuator of electric, pneumatic or hydraulic type, with the relative control devices, for instance supply ducts and electrovalves in the case of an oil-hydraulic actuator.

There is a further need to maintain the vehicle stationary on a sloping road without the driver having continuously to depress the brake pedal. In this respect it is known to use stopping devices associated with the braking unit of the vehicle in order to keep the wheels braked, with the clutch disengaged, and in particular, rather complex automatic stopping devices controlled by a relative electronic control unit.

SUMMARY OF THE INVENTION

The object of the present invention is to provide a transmission unit for a vehicle, which makes it possible to remedy the above-mentioned problems in a simple and economic way.

The present invention therefore relates to a transmission unit for a vehicle comprising a clutch unit comprising a motion input member adapted to be coupled to a motor-driven shaft and a motion output shaft adapted to be connected to an input shaft of a gear change, first actuator means for controlling the clutch unit, braking means to brake the input shaft of the gear change, and second actuator means to control the braking means, characterised in that the first and second actuator means comprise a single actuator unit common to the clutch unit and the braking means in order to actuate these braking means at least when the clutch unit is in a disengaged condition.

BRIEF DESCRIPTION OF THE DRAWINGS

The invention will be described in detail below, with reference to the accompanying drawings, which show a non-limiting embodiment thereof, and in which.

DETAILED DESCRIPTION OF THE INVENTION

Figure 1:
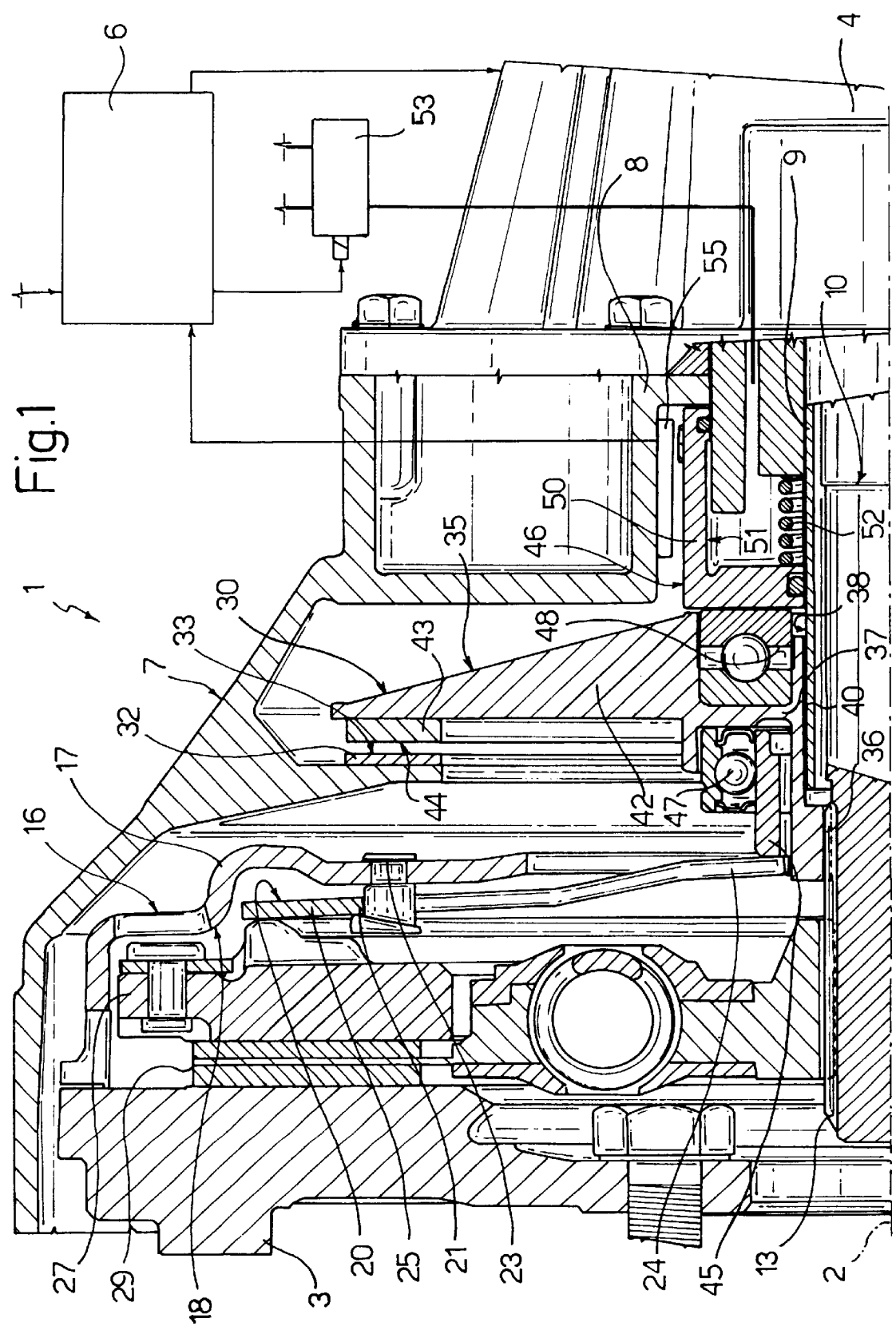
FIG. 1 shows, in section and with some parts removed for clarity, a preferred embodiment of the transmission unit of the present invention.

In FIG. 1, a transmission unit of a vehicle, shown partially, which has an axial symmetry with respect to the axis 2, with the result that the part that is not shown is substantially identical and symmetrical to the part shown in FIG. 1, is shown by 1.

The unit 1 is interposed between a flywheel 3 coupled rigidly to a drive shaft of the vehicle, and an automatic gear change 4 (shown in part). The gear change 4 in particular comprises a motion input shaft or primary shaft, and has a discrete number of gears, each of which corresponds to a specific transmission ratio between the output speed and the input speed and is adapted to be selected by the command of an electronic control unit 6 (shown diagrammatically) of the vehicle.

With further reference to FIG. 1, the unit 1 comprises a hollow structure 7 which comprises an end wall 8 rigidly connected to the gear change 4 and bears a fixed tubular member 9 extending in a projecting manner from the wall 8 along the axis 2 within this structure 7. The tubular body 9 is engaged by a coaxial motion output shaft 10, which forms the prolongation of the primary shaft of the gear change 4, is coupled to the structure 7 by relative known bearings (not shown) in order to rotate about the axis 2, and comprises a grooved end portion 13 extending axially into a position adjacent to the flywheel 3 and outside the body 9.

The unit 1 further comprises a dry friction clutch unit 16 which is known per se. The clutch unit 16 comprises the shaft 10 and the flywheel 3, to which there is rigidly connected an annular structure 17 bounding, with this flywheel 3, an annular housing 18 engaged by a preloaded cup spring 20 coaxial to the axis 2.

The spring 20 comprises an intermediate annular portion 21 connected in an angularly fixed manner to the structure 17 by a plurality of pins 23 (only one of which is shown in FIG. 1) which act as a fulcrum and enable the spring 20 to bend axially, and two opposite annular end portions 24 and 25, of which the portion 24 surrounds the shaft 10 and the portion 25 extends into the housing 18.

The clutch unit 16 further comprises an annular body or disc thruster 27 engaging the housing 18 in an angularly fixed position and moving axially with respect to the structure 17 and coupled in abutment with the portion 25, and a clutch disc 29 interposed axially between the disc thruster 27 and the flywheel 3. The clutch disc 29 is coupled to the grooved portion 13 in an angularly fixed manner and slides axially between an engaged condition in which it is disposed in contact with the disc thruster 27 and the flywheel 3 under the resilient action of the spring 20 in order to drive the shaft 10 in rotation and a disengaged condition in which it is uncoupled from the flywheel 3 and the disc thruster 27 in order to make the shaft 10 angularly idle with respect to the flywheel 3.

With further reference to FIG. 1, the unit 1 comprises a braking device 30 in turn comprising two plates 32 and 43, which are preferably made from friction material and are bounded by respective plane surfaces 33 and 44 at right angles to the axis 2 and facing one another, of which the plate 32 is borne rigidly by the structure 7 in a position facing the wall 8, while the plate 43 is borne rigidly by a moving member 35.

The member 35 comprises a tubular portion 37 coaxial to the axis 2 and coupled in an axially sliding and angularly fixed manner to the portion 13 by an end grooved section 36, and in an angularly and axially moving manner to an outer surface 38 of the tubular body 9 by a relative bearing 40.

The member 35 further comprises a disc portion 42 which extends radially from the portion 37 and bears the annular plate 43. The member 35 bears a tubular body 45 which is coaxial to the axis 2, is disposed in abutment against the portion 24 of the spring 20 in order to actuate the clutch unit 16, and is coupled to the portion 37 by a relative roller bearing 47 in order to make the body 45 angularly free with respect to the member 35.

The member 35 forms part of an actuator unit 46 common to the clutch unit 16 and the braking device 30 in order to actuate this braking device 30 when the clutch unit 16 is in the disengaged condition.

The actuator unit 46 further comprises a single linear single-acting oil-hydraulic actuator 50 which is coupled in an axially sliding and fluid-tight manner to the outer surface 38 of the tubular body 9. The actuator 50 bounds, with its surface 38, an annular chamber 51 which houses a spring 52 exerting an axial action to maintain the actuator 50 coupled to the member 35 by means of the interposition of a relative roller thrust bearing 48. The inlet/outlet of the fluid into the chamber 51 is managed by a relative known electrovalve 53 (shown diagrammatically) controlled by the control unit 6.

A position sensor 55 (shown diagrammatically) is associated with the actuator unit 46, which sensor is interposed between the structure 7 and the actuator 50, in order to detect the position of the member 35 along the axis 2 with respect to the structure 7 and to supply a relative feedback signal to the control unit 6 which can therefore determine the operating conditions of the clutch unit 16 and the device 30 and carry out a closed loop control of the electrovalve 53.

In operation, the portion 37 of the member 35 defines a slide aligned along the axis 2 with the clutch unit 16 and the actuator 50 in order successively to actuate the clutch unit 16 and the device 30.

Figure 2:
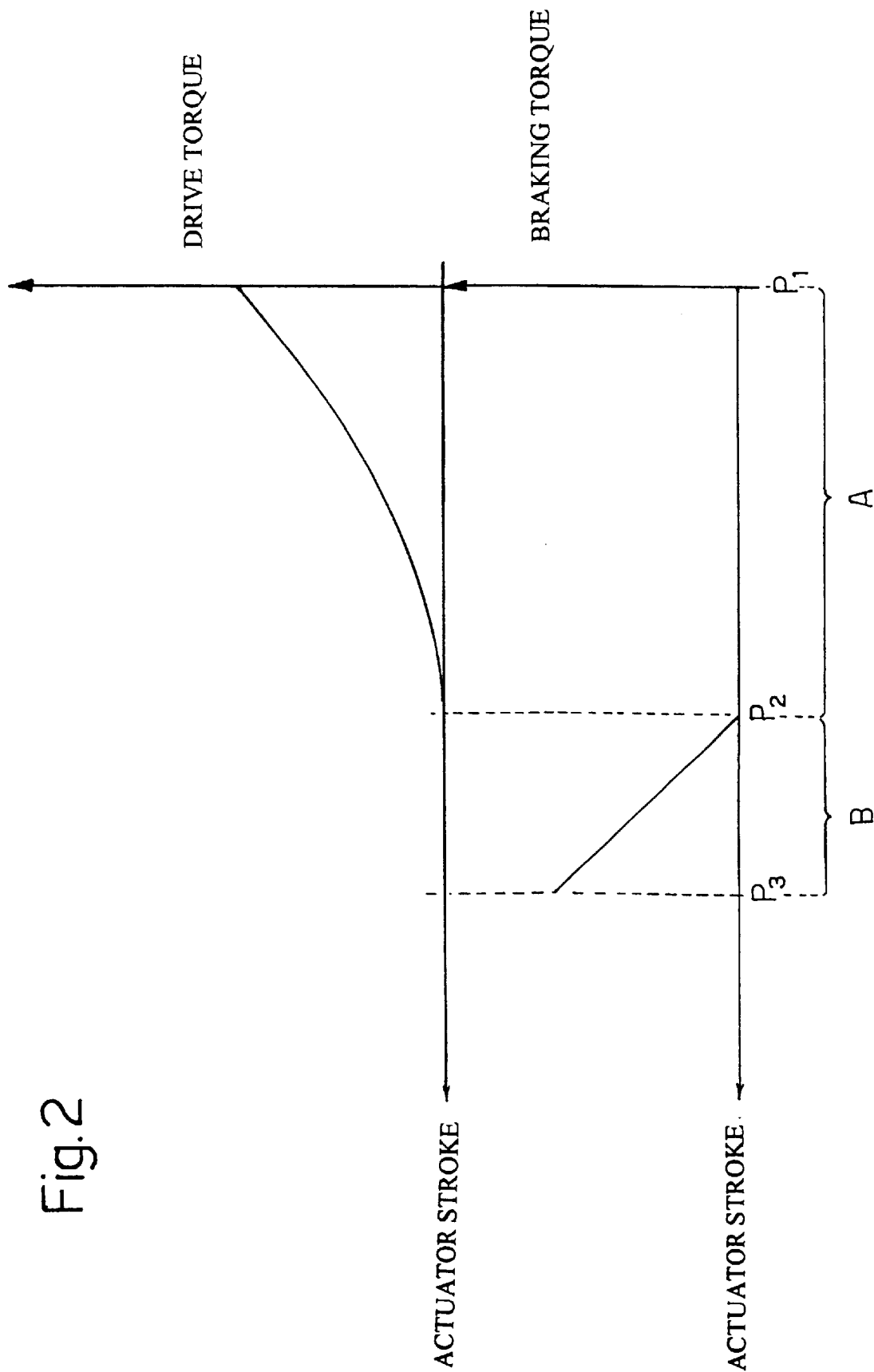
FIG. 2 is a graph of the operation of the transmission unit of FIG. 1.

FIG. 2 shows two graphs illustrating the operation of the unit 1, in which the curves of the drive torque transmitted from the clutch disc 29 to the shaft 10 and, respectively, of the braking torque of the device 30 on the shaft 10 as a function of the stroke of the actuator 50 and, therefore, of the slide 37, are shown.

The normal operating condition of the vehicle corresponds to a condition shown by the point P1, in which the actuator 50 is disposed in a retracted position adjacent to the wall 8, the surfaces 33 and 44 are spaced from one another and, therefore, the device 30 is inactive, while the clutch unit 16 is disposed in the engaged position in order to transmit the maximum drive torque from the engine to the gear change 4.

As fluid is gradually introduced into the chamber 51 to increase its pressure, the actuator 50 travels a first section of stroke, shown by A, and causes the translation of the slide 37, and therefore of the body 45, which exerts a thrust action on the portion 24 of the spring 20 in order progressively to uncouple the clutch disc 29 from the flywheel 3.

The drive torque transmitted from the clutch unit 16 to the gear change 4 is reduced proportionally to the displacement of the slide 37, until an operating condition shown by the intermediate point P2 is reached in which the clutch unit 16 is completely disengaged and the drive torque transmitted is zero, while the surfaces 33 and 44 are still spaced from one another.

As fluid continues to be introduced into the chamber 51, the slide 37 travels a second section of stroke, shown by B, in which the plates 32 and 43 frictionally cooperate with one another in order to brake the shaft 10 with the clutch unit 16 disengaged, and the braking torque gradually increases. The section B ends at a point P3 corresponding to an end-of-stroke position of the braking device 30 and of maximum braking torque acting on the shaft 10.

In order to return to the condition shown by the point P2 and then to the condition shown by the point P1, fluid is caused to flow from the chamber 51 in order to decrease its pressure, such that the action of the spring 20 on the body 45 thrusts the member 35 and the actuator 50.

Following action by the driver to select a gear with a higher transmission ratio, the unit 1 is firstly brought from the condition corresponding to the point P1 into the condition corresponding to the point P2 in order to bring the gear change 4 into neutral and then into the section B to brake the shaft 10. On the basis of the gear to be engaged, input and output angular speed signals of the gear change 4 detected by respective sensors (not shown), and the position detected by the sensor 55, the control unit 6 controls the synchronisation of the toothed wheels of the gear change 4 to be coupled.

Once these wheels have been synchronised, the unit 1 is firstly brought into the condition shown by the point P2 in order to engage the new gear and then into the condition shown by the point P1 in order again to transmit motion from the engine to the gear change 4.

In the case in which the driver controls the engagement of a gear with a lower transmission ratio, in contrast to the preceding case, after the gear change 4 has been brought into neutral, the unit 1 is brought into a condition corresponding to a point of the section A next to the point P2 in order to cause the clutch disc 29 to cooperate in a sliding manner with the flywheel 3 and to drive the shaft 10 under the action of the engine of the vehicle, until the toothed wheels to be coupled are synchronized.

When the vehicle is stationary, with the accelerator and brake pedals released, the engine in motion and the gear engaged, the unit 1 is brought into the condition corresponding to the point P3 in order to lock the shaft 10 and, consequently, the vehicle's transmission shaft. In this way, the vehicle is kept braked without the driver having to act on the brake pedal. In the case, then, when the first gear is engaged, following the actuation of the accelerator pedal, the control unit 6 brings the unit 1 back into the condition corresponding to the point P2 in order to release the shaft 10 and, progressively, into the condition corresponding to the point P1 in order to cause the vehicle to move.

It will be appreciated from the above that the transmission unit 1 makes it possible, on the one hand, to use a gear change 4 free from synchronisation devices and, on the other hand, that it is simple, economic and compact.

The clutch unit 16 and the device 30 are actuated in succession by a single actuator unit 46, connected to a single electrovalve 53, as a result of which the gear change 4 is extremely compact, since it is free from synchronisation devices, and the unit 1 is extremely simple and of lower cost than known solutions, in which the braking device housed in the gear change and the clutch unit require separate actuator units.

The unit 1 is, moreover, extremely compact and of small size as it has a slide 37 coaxial with the axis 2 interposed between the actuator 50 and the spring 20.

Lastly, the unit 1 makes it possible to keep the vehicle braked when stationary on sloping roads without the driver having to actuate the vehicle's brake pedal, and in an extremely simple manner, without having to provide the vehicle with dedicated and complex electronic stopping devices acting directly on the braking unit.

It will lastly be appreciated from the above description that modifications and variations that do not depart from the scope of protection of the present invention may be made to the transmission unit 1 as described.

In particular, the actuator 50 could be of a type other than that described and illustrated, for instance of a pneumatic or electrical, rotary rather than linear, type, or could be disposed not necessarily coaxially with the shaft 10, for instance outside the structure 7 with a recall member coupled to the slide 37 in order to actuate the device 30 and the clutch unit 16.

The braking plates 32 and 43 could also be disposed in positions other than those described and illustrated by way of example and/or the control unit 6 could operate in a different way from that described or on the basis of signals and/or conditions other than those illustrated.

The shaft 10 could lastly be made in one piece with the primary shaft of the gear change 4 or could be separate from the primary shaft and adapted to be coupled thereto.

What is claimed is:

1. A transmission unit (1) for a vehicle comprising a clutch unit (16) comprising a motion input member (3) adapted to be coupled to a motor-driven shaft and a motion output shaft (10) adapted to be connected to an input shaft of a gear change (4), first actuator means (46) to control the clutch unit (16), braking means (30) comprising an axially moving braking member (43) adapted to cooperate with an angularly fixed braking member (32) to brake the input shaft of the gear change (4), and second actuator means (46) to control the braking means (30), said first and second actuator means comprising a single actuator unit (46), said actuator unit (46) comprising a single actuator (50), said actuator unit common to the clutch unit (16) and the braking means (30) in order to actuate the braking means (30) at least when the clutch unit (16) is in a disengaged condition, wherein the actuator unit (46) comprises a single slide (37) bearing an actuation member (45) of the clutch unit (16), the slide and the axially moving braking member (43) defining part of a single body, and wherein the clutch unit (16) engages the motion input member (3) until a fluid pressure in a chamber (51) adjacent the single actuator (50) is increased, causing the single slide (37) to translate against an elastic means (20) to disengage the clutch unit (16) from the motion input member (3) and wherein, as the fluid pressure in the chamber (51) is further increased, the single slide (37) is configured to further translate against the elastic means (20) to engage the clutch unit (16) with the braking means (30).

2. A unit as claimed in claim 1, further comprising connection means (47) interposed between the slide (37) and the actuation member (45) in order to enable a free relative displacement of the actuation member (45) with respect to this slide (37).

3. A unit as claimed in claim 1, wherein slide (37) can move in a direction parallel to the output shaft (10).

4. A unit as claimed in claim 3, wherein slide (37) comprises a tubular body (37) coaxial with the output shaft (10) and coupled to this output shaft (10) in an angularly fixed position.

5. A unit as claimed in claim 4, wherein clutch unit (16), the actuator (50) and the slide (37) are aligned along the axis (2) of the output shaft (10).

6. A unit as claimed in claim 3, further comprising sensor means (55) to detect the position of the slide (37) in the said direction.

* * * * *